United States Patent
Pisz (10) Patent No.: US 9,539,943 B2
(45) Date of Patent: Jan. 10, 2017

(54) TONE BASED CONTROL OF VEHICLE FUNCTIONS

(71) Applicant: Toyota Motor Sales, U.S.A., Inc., Torrance, CA (US)

(72) Inventor: James T. Pisz, Huntington Beach, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 0 days.

(21) Appl. No.: 14/518,248

(22) Filed: Oct. 20, 2014

(65) Prior Publication Data
US 2016/0107569 A1    Apr. 21, 2016

(51) Int. Cl.
| | |
|---|---|
| *B60Q 9/00* | (2006.01) |
| *B60K 37/02* | (2006.01) |
| *G08B 3/10* | (2006.01) |
| *B60R 16/037* | (2006.01) |
| *G08C 23/02* | (2006.01) |
| *H04B 11/00* | (2006.01) |

(52) U.S. Cl.
CPC ............... *B60Q 9/00* (2013.01); *B60K 37/02* (2013.01); *B60R 16/037* (2013.01); *G08B 3/10* (2013.01); *G08C 23/02* (2013.01); *H04B 11/00* (2013.01); *B60K 2350/928* (2013.01)

(58) Field of Classification Search
CPC ....... B60Q 9/00; G08B 3/10; B60K 2350/928; B60K 37/02
USPC ............................................................ 701/36
See application file for complete search history.

(56) References Cited

U.S. PATENT DOCUMENTS

| | | | |
|---|---|---|---|
| 6,148,251 A | 11/2000 | Downs | |
| 7,680,574 B2 | 3/2010 | Berg et al. | |
| 2009/0140878 A1* | 6/2009 | Ryan, II | B60R 25/2009 340/4.37 |
| 2012/0229253 A1 | 9/2012 | Kolar | |
| 2015/0063074 A1* | 3/2015 | Oh | B60R 16/023 367/197 |

FOREIGN PATENT DOCUMENTS

EP    2661743 A1    11/2013

OTHER PUBLICATIONS

European Search Report for EP Appl. No. 15190105.5, dated Mar. 1, 2016, 6 pgs.

* cited by examiner

*Primary Examiner* — Anne M Antonucci
(74) *Attorney, Agent, or Firm* — Christopher G. Darrow; Darrow Mustafa PC (57) ABSTRACT

An apparatus and method for using audible tones generated by a vehicle driver's use of a tone actuator in a vehicle. The vehicle generates an audible tone which is capable of being heard by the driver as well as being received by a processor in the vehicle, the processor accessing a memory table correlating each distinct tone with a distinct vehicle control function. The processor outputs a signal to select the vehicle control function corresponding to the generated tone.

17 Claims, 9 Drawing Sheets

TONE BASED CONTROL OF VEHICLE FUNCTIONS

BACKGROUND

The present disclosure is related to vehicle control systems and, more particularly, to vehicle control systems using audible sounds.

Voice recognition systems have been devised to allow a control system to take pre-determined actions in response to receiving a particular spoken voice command. In the vehicle field, such voice commands can be used to control the audio system of the vehicle as well as to communicate externally of the vehicle.

However, vehicles are produced throughout the world and thus use voice commands in the language spoken in a particular country. This requires different sound recognition interfaces and may not address dialects or languages spoken by only a small percentage of the people in a country.

US Patent publication US 2012/0229253 discloses a sound activated wireless vehicle door unlock device which is capable of unlocking the vehicle door locks in response to a pre-determined series of knocks or tones issued by the vehicle user.

U.S. Pat. No. 6,148,251 discloses vehicle control systems using voice or tone commands. This system converts the tones generated by tone generators when a steering wheel mounted push buttons are actuated. The tones are only electrical frequencies which are superimposed over the signal frequency sent from the steering wheel controller to the vehicle controller which then decodes the frequency to take the indicated vehicle function action. This system, however, does not generate audible tones which the vehicle driver can hear.

It is known that vehicle drivers, particularly drivers with many years of driving experience, frequently become bored or distracted while driving for a considerable length of time, particularly on highways.

It would be useful to provide an audible recognition system for controlling selected vehicle functions which can also alleviate driver boredom and distraction.

SUMMARY

An apparatus and method for tone-based control of vehicle function utilizes vehicle function selectors mounted in the vehicle, such as on the vehicle steering wheel. Each selector is associated with a distinct audible tone and a distinct vehicle control function. Any of the vehicle function selectors causes the vehicle control function to be implemented and an audible tone to be generated which can be heard by the driver and the associated vehicle control function to be implemented.

In one aspect, a discrete tone generator is coupled to each selector to generate the audible tone. The audible tone is received and input to a processor which correlates the audible tone with a distinct vehicle control function to implement the vehicle control function.

Alternately, the tones are correlated to vehicle control functions and stored in memory. Actuation of the vehicle function selector causes both the associated audible tone to be broadcast within the vehicle as well as the vehicle control function to be implemented. A new tone can be learned and stored in memory and associated with a particular vehicle function selector.

BRIEF DESCRIPTION OF THE DRAWING

The various features, advantages and other uses of the present tone based control of vehicle functions will become more apparent by referring to the following detailed description and drawing in which.

DETAILED DESCRIPTION

The present apparatus and method provides audible tone generation associated with manually operated vehicle function selectors mounted in a vehicle cabin or passenger compartment and useable by a vehicle driver to generate audible tones which are associated with pre-assigned vehicle functions. The audible tones are capable of being heard by the vehicle driver and provide a distraction alleviating potential driver boredom. The tones can be pre-assigned to a vehicle function selector or new tones, selected by the driver, can be input to the apparatus and assigned to a particular vehicle function selector. The tones, when generated, are recognized by an audio reception portion of the apparatus which links the generated tone with a selected vehicle function to enable activation or control of the selected vehicle function.

Figure 1:
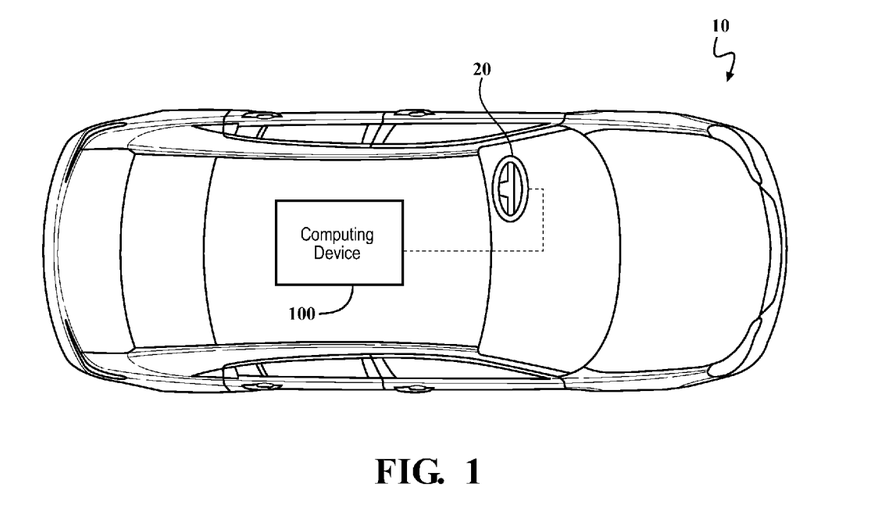
FIG. 1 is a pictorial representation of a vehicle including a computing device used in the present apparatus and method.
Figure 2:
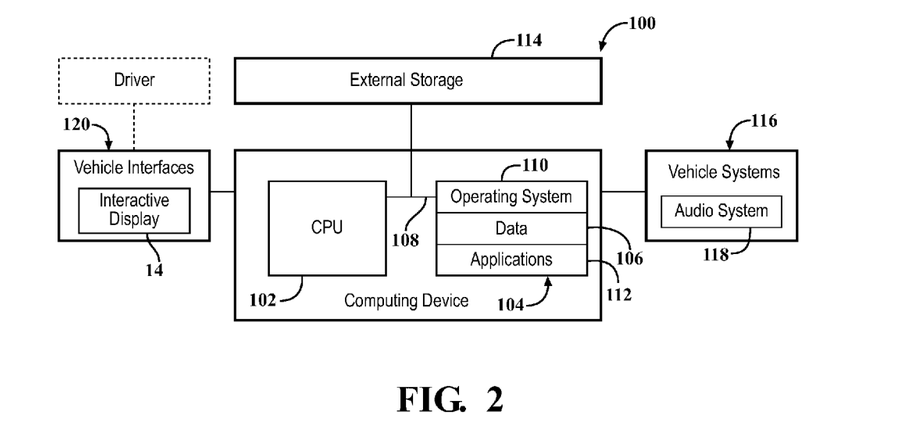
FIG. 2 is a block diagram of the computing device shown in FIG. 1 for implementing a tone based control of vehicle functions.
Figure 5:
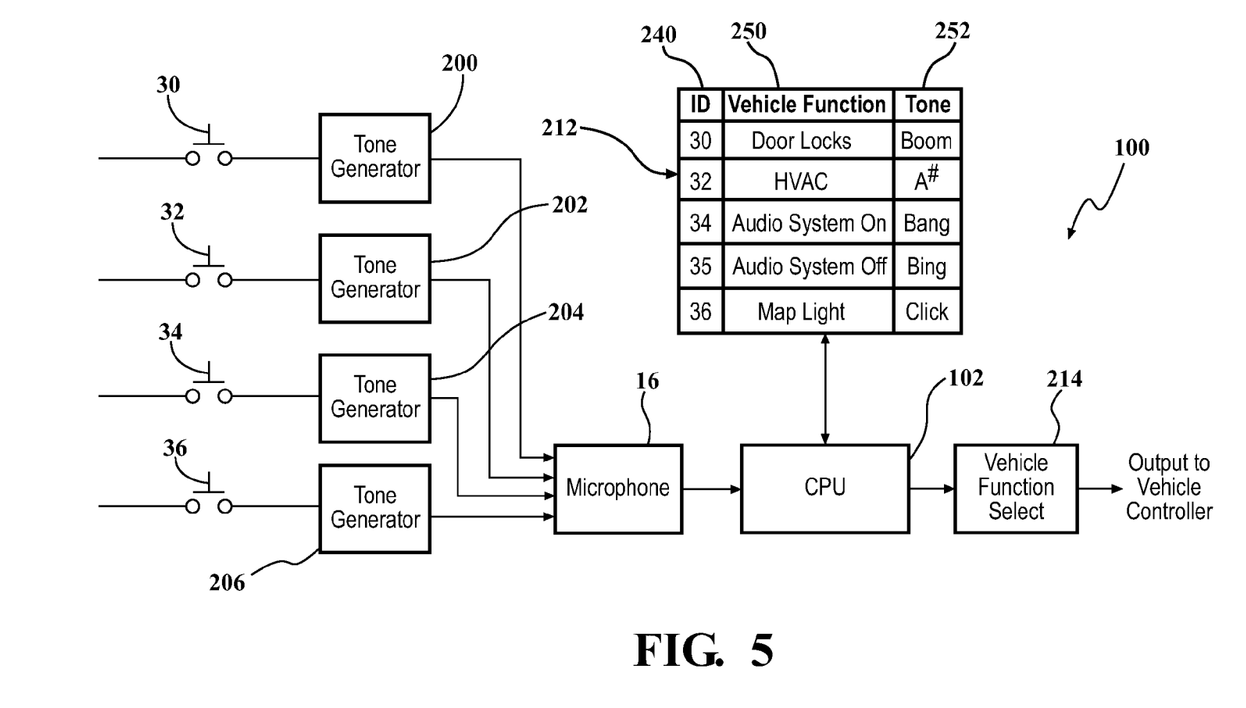
FIG. 5 is a more detailed block diagram of the tone generating and vehicle function selection apparatus and method shown generally in FIG. 2.

Referring to FIG. 1, a vehicle 10 is depicted which includes a computing device 100 described here after and shown in FIGS. 2 and 5. The computing device 100 can be located within the vehicle 10 as shown in FIG. 1, or it can be located remotely from the vehicle 10 in an alternate location, not shown. If the computing device 100 is remote from the vehicle 10, the vehicle 10 can include the capability of communicating with the computing device 100.

FIG. 2 is a block diagram of the computing device 100 for implementing an auditory interface in the vehicle 10. The computing device 100 can be any type of vehicle-installed, handheld, desktop, or other form of single computing device, or can be composed of multiple computing devices. The processing unit in the computing device 100 can be at least one or more conventional central processing units (CPU) 102 or any other type of device, or multiple devices, capable of manipulating or processing information. The memory 104 in the computing device 100 can be a random access memory device (RAM) or any other suitable type of storage device. The memory can include data 106 that is accessed by the CPU 102 using a bus 108.

The memory 104 can also include an operating system 110 and installed applications 112, the installed applications 112 including programs that permit the CPU 102 to execute stored program instructions to implement the auditory interface as described below. The computing device 100 can also include secondary, additional, or external storage 114, for example, a memory card, flash drive, or any other form of computer readable medium. In one aspect, the installed applications 112 can be stored in whole or in part in the external storage 114 and loaded into the memory 104 as needed for processing.

The computing device 100 can also be coupled to one or more vehicle systems 116. The vehicle systems 116 can be, for example, various driver selected vehicle functions, such as vehicle functions controlled from within the vehicle cabin, including, for example, HVAC controls, audio system controls, windshield wipers, map lights, interior lighting, etc. Although the vehicle control functions may be provided with selectors, such as switches or push buttons located within the vehicle cabin, the actual vehicle function may be performed by a device or system external to the vehicle cabin, such as a control system or device mounted in the engine compartment, etc.

Figure 3:
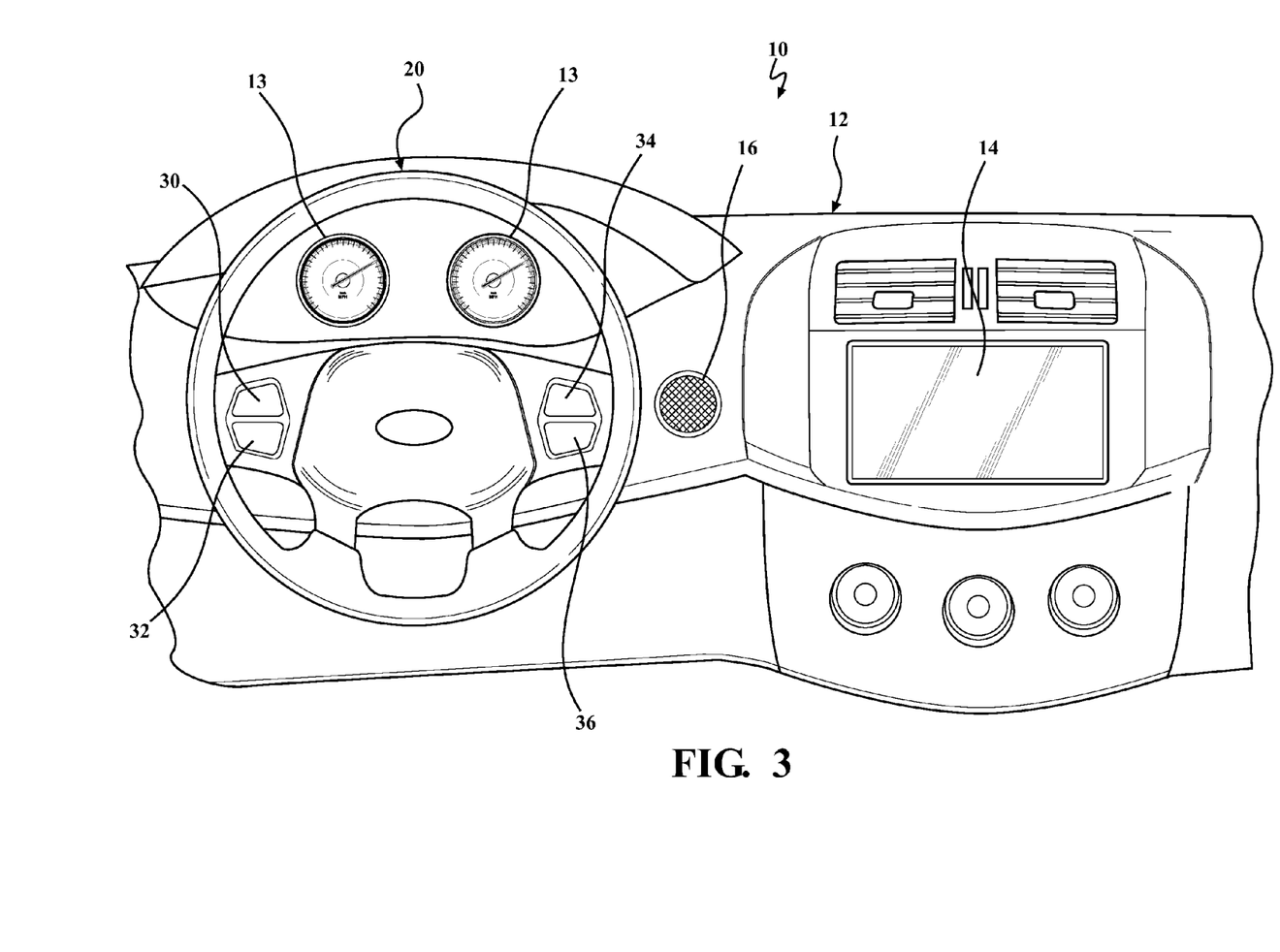
FIG. 3 is a pictorial representation of a vehicle instrument panel and steering wheel implementing part of the tone based control of vehicle functions.

The computing device 100 can also be coupled to one or more vehicle interfaces 120 configured to receive input from the driver of the vehicle. The vehicle interfaces 120 can include, for example, an interactive display 14 shown in FIG. 3. The interactive display 14 can be configured to allow the driver to send commands to the computing device 100 intended to control the operation of vehicle systems 116 as further described in FIGS. 5 and 6. As shown in FIG. 3, a vehicle instrument panel 12 is depicted by example. The instrument panel 12 includes a plurality of gauges 13 and various vehicle control selectors mounted on the instrument panel 12, on stalk switches mounted on the vehicle steering column, or on a steering wheel 20. In addition, the visible interactive display 14 can be mounted on the instrument panel 12 for receiving input from the driver as well as displaying various vehicle functions.

An audible sound or tone receiver 16, such as a microphone, can also be mounted on the instrument panel 12 for receiving audible tones and converting the audible tones to electrical signals used by the computing device 100, as described hereafter.

Figure 4:
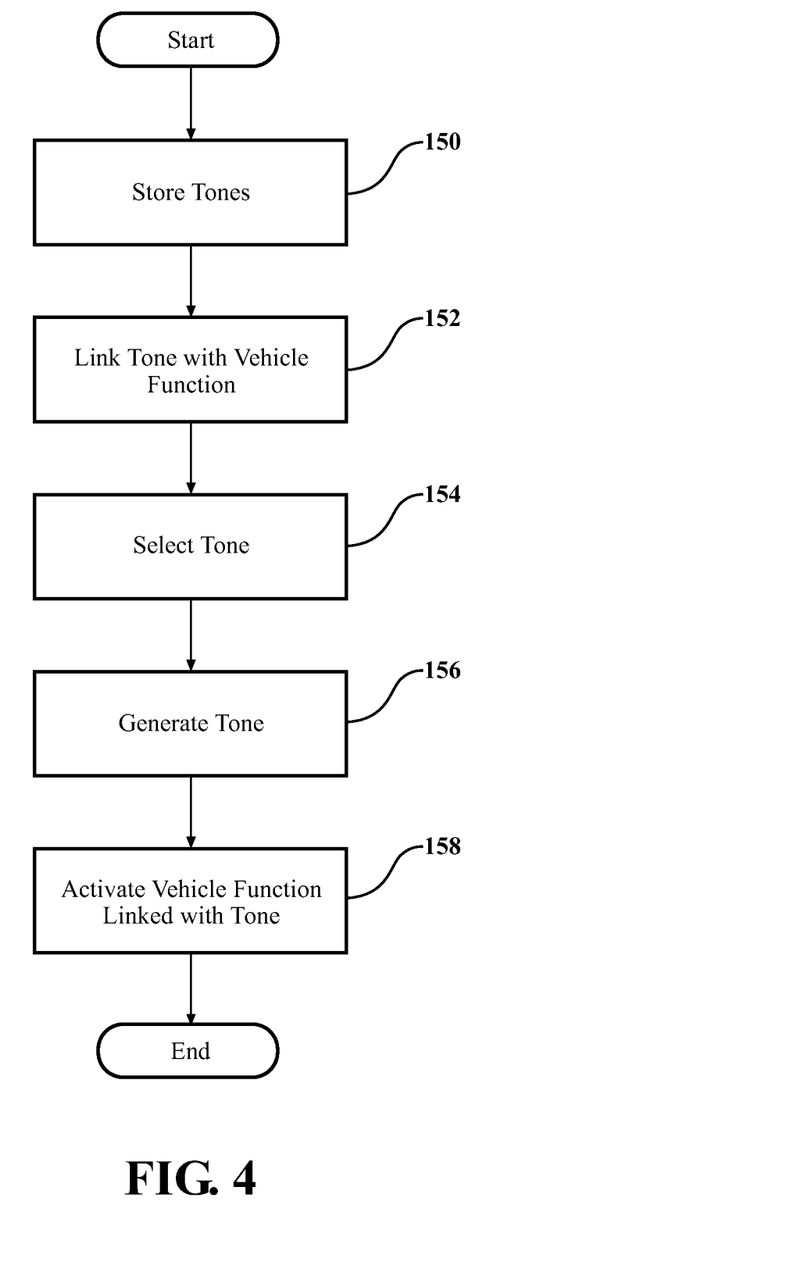
FIG. 4 is a process diagram of the operation of the tone generating and vehicle function selection apparatus and method.

Referring now to FIG. 4, there is depicted a general process flow diagram of the algorithm employed by the present apparatus and method to use audible tones to control selected vehicle functions. In step 150, as described in various aspects hereafter, audible tones are stored or provided in a selectable format so as to be audibly generated when a particular tone is selected by various means.

The apparatus and method link the selected tone in step 152 with a selected vehicle function. This enables an audible tone, when selected by a vehicle driver, to be generated and then recognized by the apparatus and method to enable control of the selected vehicle function linked with the specific tone. For example, a particular tone, as described in detail hereafter, can be linked to a specific vehicle function, such as turning on the vehicle HVAC system. A different tone, when selected and generated, can be employed to turn the vehicle HVAC system off.

In step 154, one particular tone, as described hereafter, is selected. For example, the tones may include audible sounds, such as "boom," "bang," "click," a door knock, individual musical notes, musical chords, bells, chimes, phone rings, waves, etc., as well as other common tones frequently heard in a home or office environment, or an outdoor environment, such as bird chirps, animal sounds, dog barks, etc.

The tones are tonal patterns, rather than spoken words. In this matter, sound recognition difficulties encountered with words spoken in different languages or different language dialects can be averted.

The tone may also include a plurality of tones, such as a musical chord or groups of musical notes played simultaneously or consecutively, etc.

In step 156, the apparatus and method generate the tone selected in step 154. As described hereafter, the audible generated tone is received by suitable audio tone reception devices or receiver in the vehicle or otherwise recognized by the apparatus and method to enable the vehicle function linked with the selected and generated tone to be activated or controlled in step 158.

Referring now to FIG. 5, there is depicted a detailed block diagram of the vehicle audible interface apparatus. A plurality of vehicle function selectors (hereafter "selectors"), 30, 32, 34, and 36, which can be push buttons, slide switches, etc., with four selectors 30, 32, 34, and 36 being shown by example only, are mounted within the vehicle 10 in easily accessible positions for access by the vehicle driver, without distracting the vehicle driver's eyes from the road. For example, the selectors 30, 32, 34, and 36 can be mounted in the steering wheel 20 in any suitable location, such as on the spokes connecting the outer annular ring portion of the steering wheel 20 to a central base. The selectors 30, 32, 34, and 36 may be arranged in groups or individually spaced apart at various locations on the steering wheel 20.

When the driver selects one of the selectors 30, 32, 34, and 36, the selector generates an electric signal which is coupled, respectively, in one aspect, to a tone generator 200, 202, 204, and 206, mounted in the steering wheel 20. The tone generators 200, 202, 204, and 206 are off the shelf components which generate a pre-stored audible tone in response to an input signal. Such tone generators 200, 202, 204, and 206 may include integrated circuits which have a flash memory capable of converting digital information to analog audible signals through a speaker or other broadcast element. The tone generators 200, 202, 204, and 206 provide the ability to store distinct tones as described above in connection with step 150 in FIG. 4. In addition, the direct hard-wired connection or software implemented connection of the selectors 30, 32, 34, and 36, respectively with the tone generators 200, 202, 204, and 206 links a particular vehicle function associated with each selector 30, 32, 34, and 36 with a distinct tone provided by each separate tone generator 200, 202, 204, and 206.

Each tone generator 200, 202, 204, and 206 generates a unique, distinct tone which can be distinguished by a tone receiver 16, associated with the CPU 102.

Figure 6:
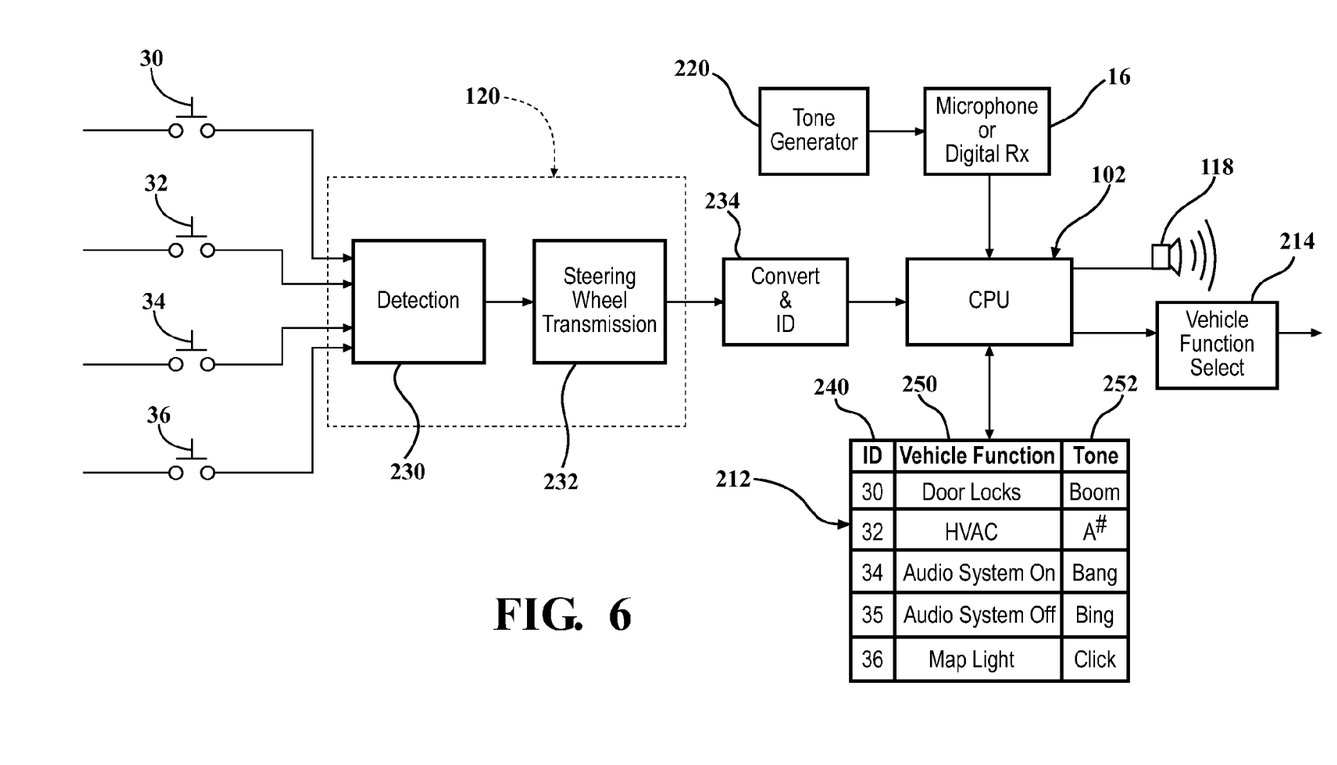
FIG. 6 is a block diagram of an alternate tone generating and vehicle function selection apparatus and method.

The tone receiver 16, such as a microphone, is an electronic circuit which receives the audible tone from one of the tone generators 200, 202, 204, and 206, and converts the audible tone from analog to digital format, and generates a tone identifier indicating which selector 30, 32, 34, and 36 generated the received tone. This tone identifier is input to the CPU 102 which accesses a lookup table 212 in the memory 104 associating each distinct tone with a particular vehicle function as shown in FIG. 6.

The CPU 102 outputs the identified vehicle function as a signal from a vehicle function select circuit 214 and sends the signal to a respective vehicle function controller to take the requested vehicle function action, as described in step 158 in FIG. 4.

In addition to enabling the vehicle driver to control a selected vehicle function without distraction or removing his or her eyes from the surrounding environment or road, the tones generated by the tone generators 200, 202, 204, and 206 provide an audible distraction to the vehicle driver to relieve boredom and keep the driver alert during vehicle operation.

It will also be understood that two or more of the selectors 30, 32, 34, and 36 may be actuated simultaneously causing a plurality of distinct tones to be generated by the tone generators 200, 202, 204, and 206. However, even when multiple tones are received by the tone receiver, the tone receiver 16 is capable of outputting separate tone ID's to the CPU 102 which then can look up the vehicle function associated with each of the plurality of tones and generate the appropriate vehicle function signals. This allows the computing device 100 to control a greater number of vehicle functions than would be possible by a direct single correlation between one selector 30, 32, 34, and 36 and one vehicle control function.

It will be understood that the computing device 100 can be configured to treat the simultaneous generation and receiving of two audible tones, when two of the selectors 30, 32, 34, and 36 are simultaneously actuated or moved, as separate tones, each associated with a respective pre-assigned vehicle control function as shown in the lookup table 212 in FIG. 5, or as a new tone associated with a distinct, separate vehicle control function. For example, simultaneous depression of the selectors 30 and 32 will cause audible tones in the form of a musical note A# and "boom" to be simultaneously generated. Although not shown in the lookup table 212, the combined A# and "boom" tone can be interpreted by the CPU 102 as a new tone signal for a different vehicle control function, not shown in the lookup table 212.

It is also possible to configure the computing device 100 in a form which does not use separate tone generators 200, 202, 204, and 206 associated with specific selectors 30, 32, 34, and 36. In this aspect, as shown in FIG. 6, a digital form of an audible tone is stored in the memory 104 and accessed through the lookup table 212 and associated with one of the selectors 30, 32, 34, and 36 pre-assigned to specific vehicle functions. When one of the selectors 30, 32, 34, and 36 is actuated, a unique signal from the activated selector 30, 32, 34, and 36, such as a voltage or current level, frequency, etc., is input to a detection circuit 230 in the vehicle interface 120. The detection circuit 230 identifies the activated selector 30, 32, 34, and 36 and transmits the selector ID through a steering wheel transmission device, such as a sliding ring contact, to a conversion and ID generator 234. The output of the converter and selector ID generator 234 is input to the CPU 102 which then uses the selector ID that was actuated to access the lookup table 212 and generate a signal used for the selected vehicle function.

As shown in FIG. 6, the lookup table 212 correlates selector IDs 240 with a unique vehicle function 250 and a unique tone 252. For example, if selector 30 is depressed, the generated signal, after passing through the detection circuit 230, the steering wheel transmission device 232 and the converter and ID generator 234, is used by the CPU 102 to access the lookup table 212 and select the vehicle function from column 250 and the audible tone from column 252 associated with the selector ID 240 corresponding to selector 30.

The CPU 102 then generates a signal to the vehicle function select circuit 214 which is outputted to the vehicle function controller associated with the desired vehicle function, such as the door locks associated with selector 30.

At the same time, the CPU 102 takes the digitally stored form of the tone in column 252 associated with the selector 30 and outputs the tone through a speaker, which may be the vehicle audio system speakers 118. Thus, in this manner, depression of one of the selectors 30, 32, 34, and 36 by the driver causes the simultaneous generation of an output signal to a vehicle controller to operate the vehicle control function associated with the selector and, at the same time, the generation of an audible tone which can be heard by the driver, and uniquely associated with the selector.

The apparatus and method can also be provided with the capability of learning a new tone. As shown in FIG. 6, and in the algorithm of FIG. 7, a separate tone generator 220 can be provided to generate a new audible tone which the vehicle driver wishes to store as part of the tone associated control of vehicle functions. The tone generator 220, although illustrated as an actual element, can take many forms, such as a musical note generated by a musical instrument, such as a guitar, or an audible tone generated by a tone generator from the driver's mobile device, i.e., smart phone, tablet, etc. In the case of the driver's mobile phone, the selected tone can be pre-recorded or stored in the mobile device.

Figure 7:
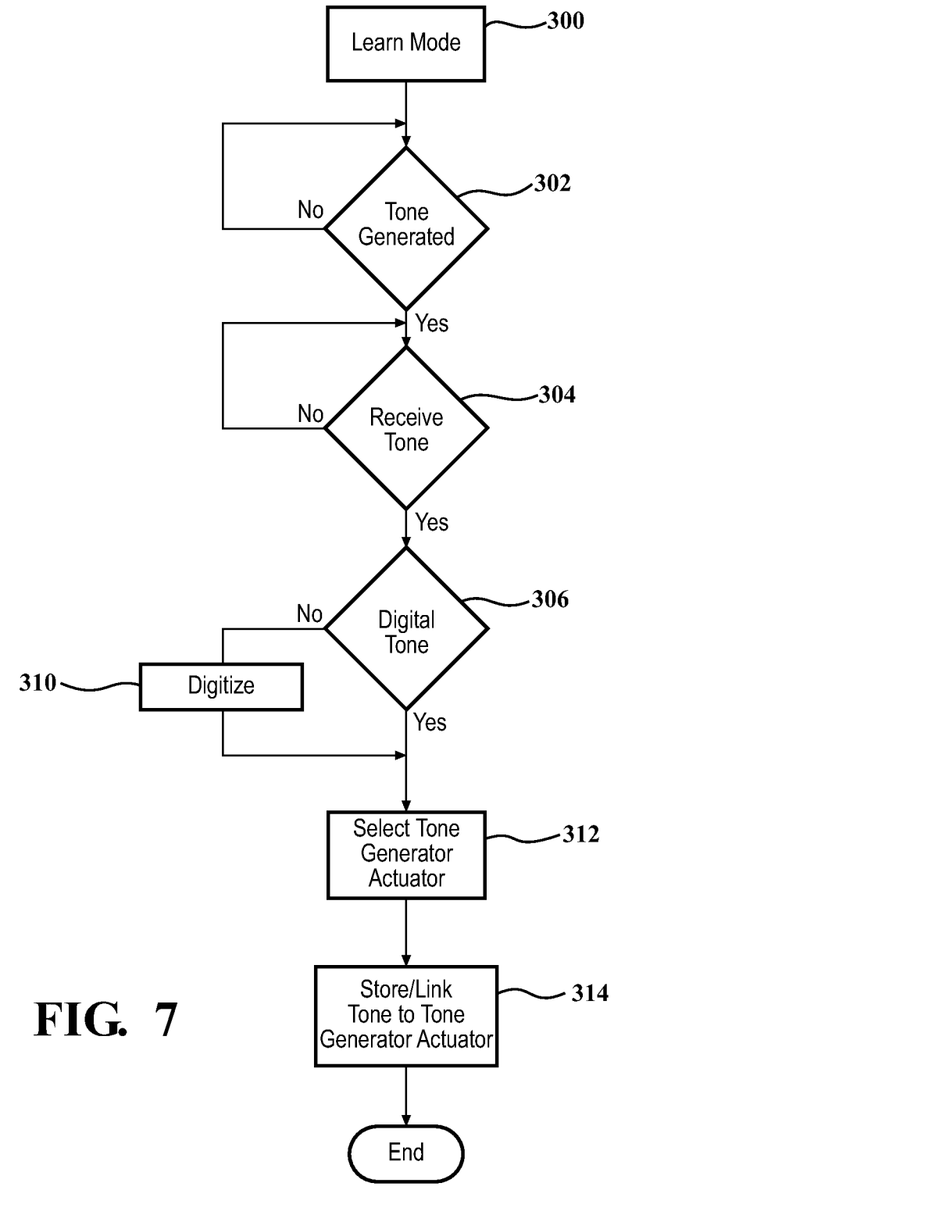
FIG. 7 is a logic flow chart of a process performed by the apparatus as shown in FIG. 5 for learning a new tone to control a vehicle function.

The tone generated by the tone generator 220 is received by the microphone 16 on the instrument panel 12. This analog signal is then converted by the microphone 16 or a digital receiver and input to the CPU 102 when the learn mode is entered in step 300.

A select signal to enter the learn mode could be a double tap on any of the selectors 30, 32, 34, and 36, the depression and hold of one of the selectors 30, 32, 34, and 36 for a pre-determined amount of time, such as 5 seconds or more, a separate input switch or signal generating device, not shown, etc.

Once the learn mode is entered in step 300, a user can generate the tone through the tone generator 220. This audible tone is received by the microphone 16 in the vehicle instrument panel 12. The microphone 16 can be an analog microphone or a digital receiver which converts the received tone to a digital signal which then is input to the CPU 102. The CPU 102 determines that a tone generated in step 302 has been received in step 304, the CPU 102 determines whether the tone is a digital tone or an analog tone in step 306. If the received tone is an analog tone, the CPU 102 digitizes the analog signal received from the microphone 16 in step 310. The output of step 306 or step 310 is temporarily saved by to the CPU 102.

The CPU 102 then waits for the user to select a particular selector 30, 32, 34, or 36 to be associated with the new tone. This can be any of the selectors 30, 32, 34, and 36 mounted on the vehicle steering wheel 20. The driver selects the appropriate selector which has been pre-assigned to a particular vehicle function, actuation, by activating the selector 30, 32, 34, or 36 in a manner distinct from the sequence used to select a vehicle function or enter the learn mode in step 300. For example, if the learn mode is entered in step 300 by a double tap depression in quick succession of a selector, the step 312 can be implemented by the driver depressing one selector for a longer length of time, such as 5 or 10 seconds. When the CPU 102 receives a selector assigned signal in step 312, the CPU 102 links the selector ID with the new tone in the lookup table 212 in the memory 104 for the same vehicle function previously associated with the selector.

Figure 8:
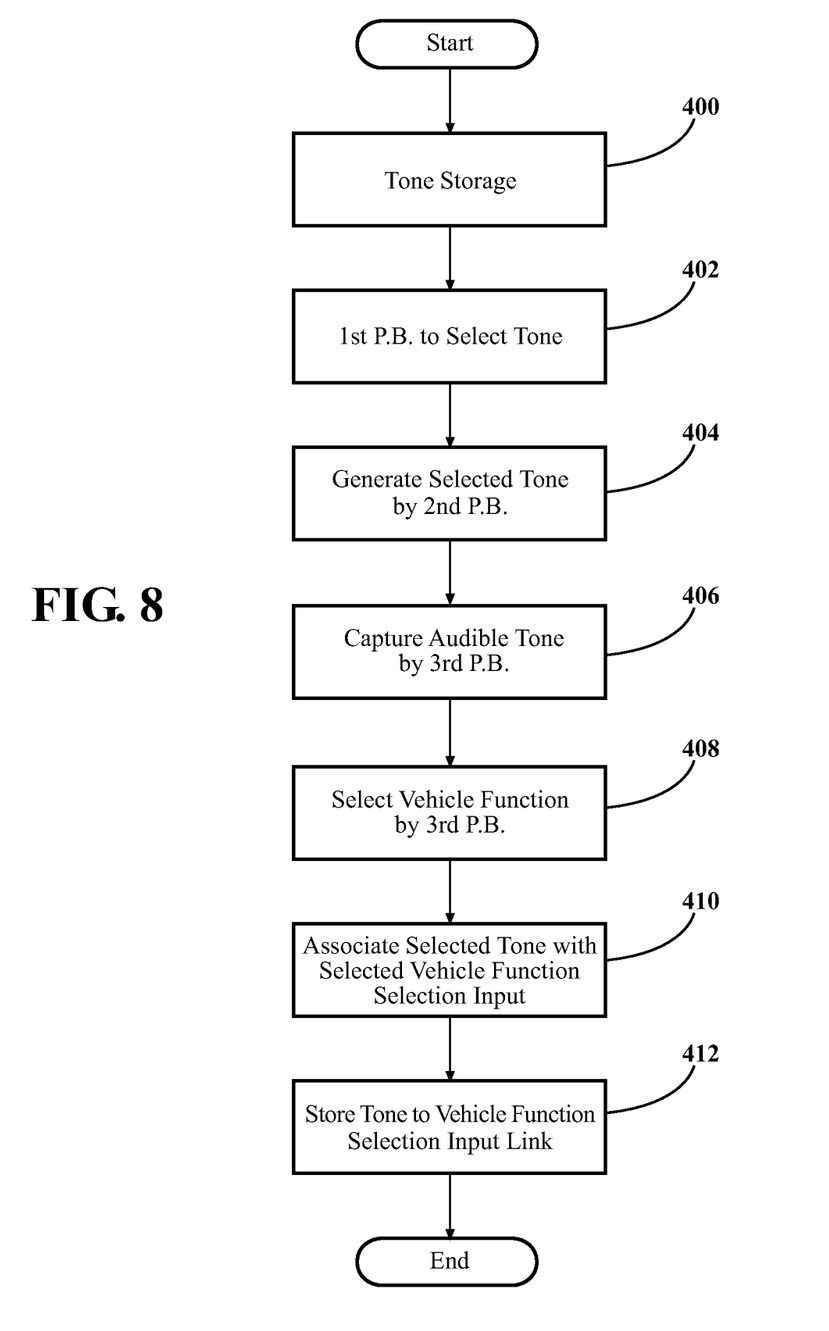
FIG. 8 is a process diagram of another aspect of the present apparatus and method.

Referring now to FIG. 8, in another aspect of the present apparatus and method, a first selector 30, 32, 34, or 36, is located in a conveniently accessible location in the vehicle, such as on the steering wheel or near the steering wheel within easy reach of the driver. The selector 30 could be associated with the tone generator 200 or coupled as an input to the CPU 102 to access a plurality of tones stored in a tone storage memory in step 400. The selector 30 is activated to select one tone from step 402. The same first selector 30 could be activated any number of consecutive times to select different tones in the tone storage. The selected tone(s) are generated in step 404 and broadcast through a speaker or other audio sound generator so as to be able to be heard by the driver. The second selector 30, also having electronic memory capabilities, is then activated in step 406. Next, a third selector 34 is actuated in step 408 to select a specific vehicle function. The third selector 34 may be located on the vehicle dashboard or steering wheel and is associated with a particular vehicle function, such as turning the air conditioning on and off, turning the audio system on and off, turning the headlights on and off, etc. The actuation of the vehicle function by the third selector 34 associates in step 410 a selected captured audible tone from step 406 with the selected vehicle function from step 408. The links associate the tone to the vehicle function in step 412 in memory such that future actuation of the third selector 34 causes the tone linked to the vehicle function selection input to be audibly generated as well as to enable the vehicle function to be actuated.

Figure 9:
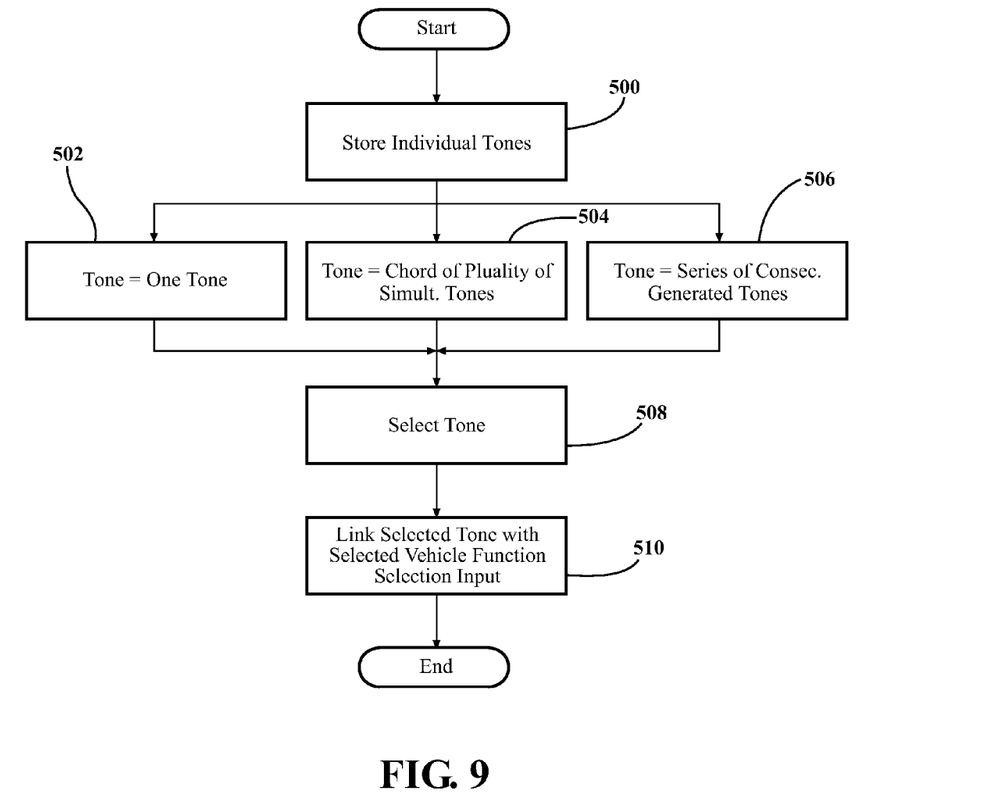
FIG. 9 is a process diagram of another aspect of the apparatus and method.

FIG. 9 depicts another aspect of the present apparatus and method using a unique automatic tone recognizer. A plurality of individual tones are stored in step 500. For example, a plurality of discrete individual tones could be stored in a lookup table with respective letters A-Z. Individual tones can be utilized in step 502 as a single distinct tone. Alternately, in step 504, a plurality of individual tones from step 500 can be associated and simultaneously generated as a chord. In step 506, a plurality of individual tones from step 500 can be grouped as a consecutive sequence of separate and consecutively generated tones in step 506.

In this manner, a large number of different vehicle functions and distinct tones can be generated in step 508 by use of suitable selectors or push buttons, including a numeric key pad where an individual number denotes one of the tones from steps 502, 504, and 506. Selecting one of the tones in step 508 can then be used according to any of the methods described above, to link the selected tone with a selected vehicle function selection input in step 510.

Figure 10:
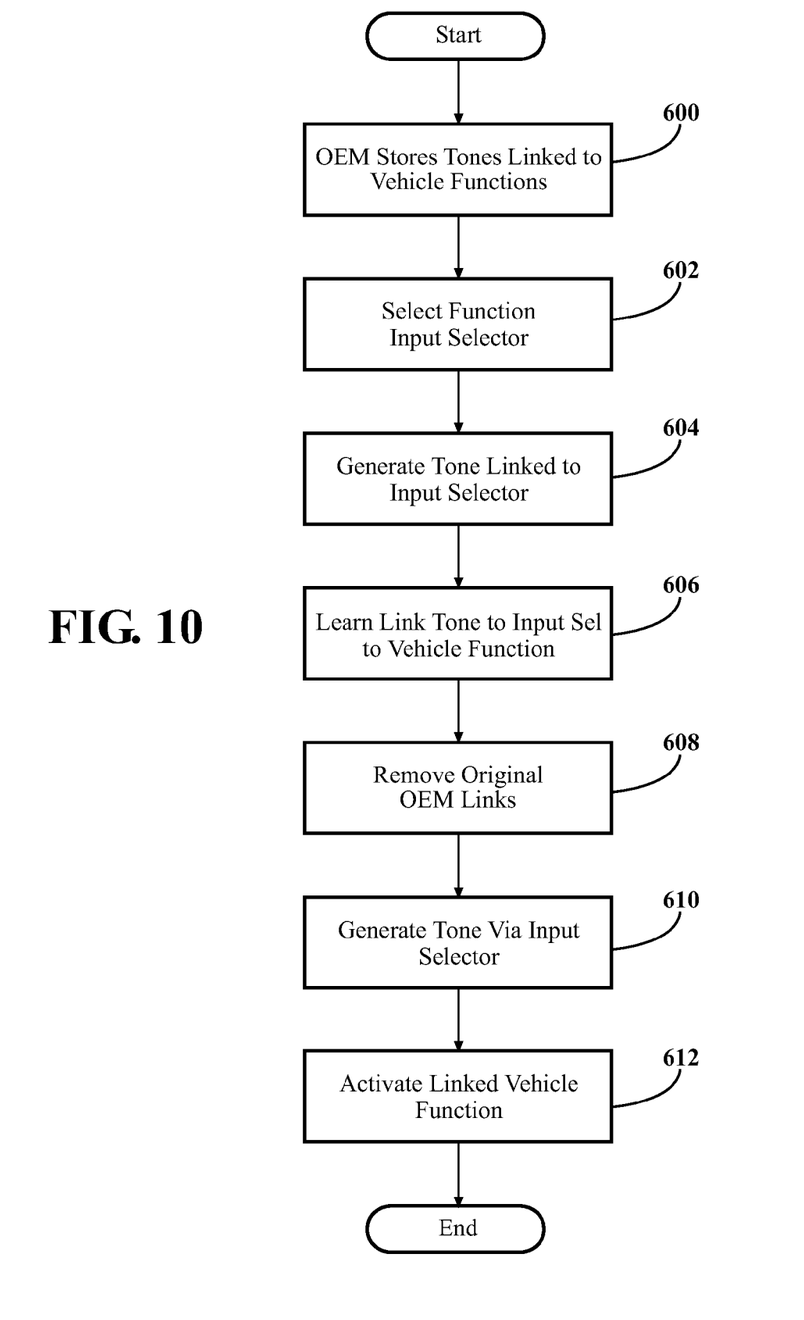
FIG. 10 is a process diagram of another aspect of the apparatus and method.

Another aspect of the present apparatus and method is depicted in the process flow diagram of FIG. 10. In step 600, the original equipment manufacturer (OEM) of the vehicle can initially store a plurality of tones in the memory 104 which are accessible through the CPU 102. In this manner, individual push button or input selectors on the vehicle steering wheel, door or dashboard, are programmed by the OEM to unique tones. For example, one interface button may link the tone "bang" with turning the vehicle audio system "on". A second vehicle interface button may be associated with turning the air conditioning "off" and generate a "ring" tone.

In this manner, when the vehicle driver selects a particular function input selector in step 602, the CPU 102 generates the tone linked to that input selector in step 604. This enables the driver to learn to link the audibly heard tone associated with the input selector to the particular vehicle function in step 606.

After the driver becomes familiar with the links between specific tones and specific vehicle functions, or after a set time period has elapsed, for example, the original OEM links stored in step 600 can be removed in step 608. From then on, activation of one of the vehicle interface push buttons causes the specific tone associated with the vehicle function to be generated in step 610 in the same manner as described above. At the same time, the generated tone is processed by the apparatus to activate the linked vehicle function in step 612.

The present apparatus and method provides audible tone generation when the vehicle function selector is manually actuated. The audible tones are associated with preassigned vehicle function. The audible tones provide a distraction to the driver alleviating potential boredom. The audible tones, when generated, are received by an audible tone receiver in the vehicle and used by the processor to identify the selector and the vehicle functions to enable an output signal to be sent to a vehicle controller to implement the selected vehicle function.

What is claimed is:
1. A method of controlling vehicle functions comprising:
associating a selector in a vehicle to a vehicle function;
providing a distinct audible tone associated with the selector;
when the selector is actuated, generating and sending an electric signal to an audible tone generator coupled to the selector;
using the audible tone generator, generating the distinct audible tone associated with the selector;
receiving the distinct audible tone at an audible tone receiver;
converting, using the audible tone receiver, the distinct audible tone from analog to digital format and generating a tone identifier; and
activating the vehicle function in response to the tone identifier being received.

2. The method of claim 1 further comprising:
associating each of a plurality of selectors with a respective one of a plurality of distinct vehicle functions; and
associating a distinct audible tone with each of the plurality of selectors.

3. The method of claim 1 further comprising:
using at least one processor executing program instructions, in response to the received audible tone from the audible tone receiver, to generate an output for a vehicle function associated with the received audible tone.

4. The method of claim 1 further comprising:
storing the audible tone in memory; and
in response to identifying an actuated selector, generating the audible tone associated with the actuated selector.

5. The method of claim 4 further comprising:
configuring the selector as a push button in the vehicle.

6. The method of claim 5 further comprising:
mounting the push button on a vehicle steering wheel.

7. The method of claim 1 further comprising:
substituting a new tone for a prior tone and associating the new tone with one selector.

8. The method of claim 1 wherein the step of providing the distinct audible tone associated with the selector comprises:
providing the distinct audible tone as one of a plurality of simultaneously generated tones, and a plurality of consecutively generated discrete tones.

9. The method of claim 1 wherein the step of providing the distinct audible tone associated with the selector comprises:
pre-assigning a plurality of distinct tones to a plurality of distinct selectors such that actuation of each selector generates the audible tone associated therewith.

10. A vehicle function control apparatus utilizing audible tones, the apparatus comprising:
at least one tone generator configured for receiving an electric signal and emitting at least one audible tone;
a selector for a vehicle function, the selector being mountable in a vehicle, coupled to the tone generator, and associated with the at least one audible tone;
an audible tone receiver, mounted in the vehicle, for receiving the at least one audible tone, converting the audible tone from analog to digital format, and generating a tone identifier;
a memory storing correlations between the tone identifier and the vehicle function; and
at least one processor executing program instructions in response to receiving the tone identifier, to generate an output selecting the vehicle function associated with the selector.

11. The apparatus of claim 10 further comprising:
a plurality of tone generators and a plurality of selectors, each tone generator generating a distinct audible tone when the selector associated therewith is actuated.

12. The apparatus of claim 11 wherein:
at least two of the plurality of selectors and at least two of the plurality of tone generators are capable of simultaneous actuation and generation.

13. The apparatus of claim 10 wherein the at least one tone generator is mounted in a vehicle.

14. The apparatus of claim 13 further comprising:
a plurality of tone generators, each generating a distinct audible tone; and
a plurality of selectors, each selector associated with a respective tone generator.

15. The apparatus of claim 14 wherein the selectors comprise separate push buttons.

16. The apparatus of claim 15 wherein:
the push buttons are mounted on a vehicle steering wheel.

17. The apparatus of claim 10 further comprising:
the at least one tone generator including a tone stored in a memory; and
the at least one processor executing program instructions, when the vehicle function is selected by the selector, to audibly broadcast the audible tone associated with the vehicle function selected and generate a vehicle control function output associated to the audible tone and sending the vehicle control function output to a vehicle function controller.

* * * * *